(12) United States Patent
Nomura

(10) Patent No.: US 9,281,545 B2
(45) Date of Patent: Mar. 8, 2016

(54) METHOD OF CONTROLLING DISCHARGE, BATTERY PACK, ELECTRICAL STORAGE SYSTEM, ELECTRONIC APPARATUS, ELECTRIC VEHICLE AND POWER SYSTEM

(71) Applicant: Sony Corporation, Tokyo (JP)

(72) Inventor: Tsuyoshi Nomura, Fukushima (JP)

(73) Assignee: SONY CORPORATION, Tokyo (JP)

( * ) Notice: Subject to any disclaimer, the term of this patent is extended or adjusted under 35 U.S.C. 154(b) by 564 days.

(21) Appl. No.: 13/657,376

(22) Filed: Oct. 22, 2012

(65) Prior Publication Data

US 2013/0106173 A1    May 2, 2013

(30) Foreign Application Priority Data

Oct. 27, 2011 (JP) ................. 2011-235838

(51) Int. Cl.
| | |
|---|---|
| *H02J 7/00* | (2006.01) |
| *H01M 10/44* | (2006.01) |
| *B60L 3/00* | (2006.01) |
| *B60L 11/18* | (2006.01) |
| *H01M 10/052* | (2010.01) |
| *H01M 10/48* | (2006.01) |

(52) U.S. Cl.
CPC ........... *H01M 10/443* (2013.01); *B60L 3/0046* (2013.01); *B60L 11/1861* (2013.01); *H02J 7/0016* (2013.01); *B60L 2240/545* (2013.01); *B60L 2240/547* (2013.01); *H01M 10/052* (2013.01); *H01M 10/486* (2013.01); *H02J 7/0091* (2013.01); *Y02T 10/7005* (2013.01); *Y02T 10/705* (2013.01); *Y02T 10/7011* (2013.01); *Y02T 10/7044* (2013.01); *Y02T 10/7055* (2013.01)

(58) Field of Classification Search
USPC .................................. 320/134–136, 150–154
See application file for complete search history.

(56) References Cited

U.S. PATENT DOCUMENTS

| | | | |
|---|---|---|---|
| 2003/0021073 A1* | 1/2003 | Nagata ............................ | 361/78 |
| 2003/0043761 A1* | 3/2003 | Hladik ........................... | 370/319 |
| 2010/0109611 A1* | 5/2010 | Schaefer et al. ............... | 320/134 |
| 2010/0194346 A1* | 8/2010 | Lee et al. ....................... | 320/134 |

FOREIGN PATENT DOCUMENTS

JP    2961853    10/1999

* cited by examiner

*Primary Examiner* — Samuel Berhanu
(74) *Attorney, Agent, or Firm* — Hazuki International, LLC

(57) ABSTRACT

A method of controlling discharge in a battery pack, including: measuring an ambient temperature of a battery cell and a voltage of the battery cell; a first discharge processing of discharging the battery cell until the voltage of the battery cell becomes a second voltage lower than a first voltage when the ambient temperature is higher than a first predetermined temperature and the voltage of the battery cell is higher than the first voltage; and a second discharge processing of discharging the battery cell until the voltage of the electrical battery cell becomes a fourth voltage lower than a third voltage when the ambient temperature is lower than the first predetermined temperature and the voltage of the battery cell is higher than the third voltage.

18 Claims, 9 Drawing Sheets

METHOD OF CONTROLLING DISCHARGE, BATTERY PACK, ELECTRICAL STORAGE SYSTEM, ELECTRONIC APPARATUS, ELECTRIC VEHICLE AND POWER SYSTEM

CROSS REFERENCES TO RELATED APPLICATIONS

The present application claims priority to Japanese Priority Patent Application JP 2011-235838 filed in the Japan Patent Office on Oct. 27, 2011, the entire content of which is hereby incorporated by reference.

BACKGROUND

The present disclosure relates to, for example, a method of controlling discharge of a battery pack, a battery pack, an electrical storage system, an electronic apparatus, an electric vehicle, and a power system using the battery pack.

Electrical storage devices represented by batteries have been used in various electronic apparatuses. Lithium ion secondary batteries are an example of a type of battery that is mainly used in the electronic apparatuses. Since they are rechargeable and capable of outputting high voltage, lithium ion secondary batteries have been widely used. Recently, in order to satisfy the demand for higher output and capacity, assembled batteries composed of a plurality battery cells in multi-serial or in multi-parallel have been increasingly used. Such assembled batteries are housed in a case to form a battery pack.

If the battery pack is not used for a long time in a high temperature environment, performance of the battery pack is lowered due to swelling of the battery pack or the generation of gas. A technique that discharges a secondary battery when the secondary battery is not used in a high temperature environment, is disclosed in Japanese Patent No. 2961853.

SUMMARY

In the technique disclosed in Japanese Patent No. 2961853, a secondary battery is electrically connected to a discharge circuit by turning on a bi-metal switch when the battery is in high temperature conditions. Since a bi-metal switch is used, there is a problem that the size of the battery pack is increased. In addition, Japanese patent No. 2961853 does not disclose discharging the battery pack in a normal temperature environment.

It is desirable to provide a battery pack which performs a discharge process as necessary in both a high temperature environment and a normal temperature environment.

According to an embodiment of the present disclosure, there is provided a method of controlling discharge of a battery pack, including: measuring an ambient temperature of a battery cell and a voltage of the battery cell; a first discharge processing of discharging the battery cell until the voltage of the battery cell becomes a second voltage lower than a first voltage when the ambient temperature is higher than a first predetermined temperature and the voltage of the battery cell is higher than the first voltage; and a second discharge processing of discharging the battery cell until the voltage of the electrical battery cell becomes a fourth voltage lower than a third voltage when the ambient temperature is lower than the first predetermined temperature and the voltage of the battery cell is higher than the third voltage.

According to another embodiment of the present disclosure, there is provided a battery pack including: a battery cell; and a control section to which information on an ambient temperature of the battery cell and information on a voltage of the battery cell are input, wherein the control section performs a first discharge processing of discharging the battery cell until the voltage of the battery cell becomes a second voltage lower than a first voltage when the ambient temperature is higher than a first predetermined temperature and the voltage of the battery cell is higher than the first voltage, and the control section performs a second discharge processing of discharging the battery cell until the voltage of the battery cell becomes a fourth voltage lower than a third voltage when the ambient temperature is lower than the first predetermined temperature and the voltage of the battery cell is higher than the third voltage.

According to still another embodiment of the present disclosure, there is provided a battery pack including: a battery cell; a positive line connected to a positive electrode of the battery cell; a negative line connected to a negative electrode of the battery cell; and a control section to which information on an ambient temperature of the battery cell and information on a voltage of the battery cell are input and which has at least a first terminal connected to the positive line and a second terminal outputting a control signal having a different voltage level in response to a voltage of the battery cell; and a resistor connected between the second terminal and the negative line, wherein the control section performs a first discharge processing of discharging the battery cell until the voltage of the battery cell becomes a second voltage lower than a first voltage when the ambient temperature is higher than a first predetermined temperature and the voltage of the battery cell is higher than the first voltage, the control section performs a second discharge processing of discharging the battery cell until the voltage of the battery cell becomes a fourth voltage lower than a third voltage when the ambient temperature is lower than the first predetermined temperature and the voltage of the battery cell is higher than the third voltage, and the first discharge processing and the second discharge processing are performed by applying current to a discharge line having the positive line, the first terminal, the second terminal, the resistor and the negative line.

According to still another embodiment of the present disclosure, there is provided an electrical storage system, wherein the battery pack is charged by a power generator performing power generation based on a renewable energy source.

According to still another embodiment of the present disclosure, there is provided an electrical storage system including the battery pack, wherein the system supplies electric power to electronic apparatus connected to the battery pack.

According to still another embodiment of the present disclosure, there is provided an electronic apparatus receiving electric power from the battery pack.

According to still another embodiment of the present disclosure, there is provided an electric vehicle including a conversion device that receives electric power from the battery pack and converts the power into a driving force of the vehicle; and a control device that performs information processing related to vehicle control based on information related to the battery pack.

According to still another embodiment of the present disclosure, there is provided a power system including a power information transmission and reception unit that transmits and receives signals to and from external apparatuses via a network, wherein the system performs charge and discharge control of the battery pack based on information received by the power information transmission and reception unit.

According to still another embodiment of the present disclosure, there is provided a power system that receives electric power from the battery pack or supplying electric power to the battery pack from a generator or a power network.

According to at least one embodiment, there is provided a battery pack capable of performing a discharge process as necessary in a high temperature environment and a normal temperature environment.

Additional features and advantages are described herein, and will be apparent from the following Detailed Description and the figures.

BRIEF DESCRIPTION OF THE FIGURES

FIG. 2 is an example of a setting for a detected voltage, a return voltage and the like;

DETAILED DESCRIPTION

Embodiments of the present disclosure will be described with reference to the drawings below. In addition, the description is made in the following sequence.
1. First Embodiment
2. Second Embodiment
3. Modification
4. Application example In addition, the present disclosure is not limited to an embodiment to be described below.

1. First Embodiment

Configuration of Battery Pack

Figure 1:
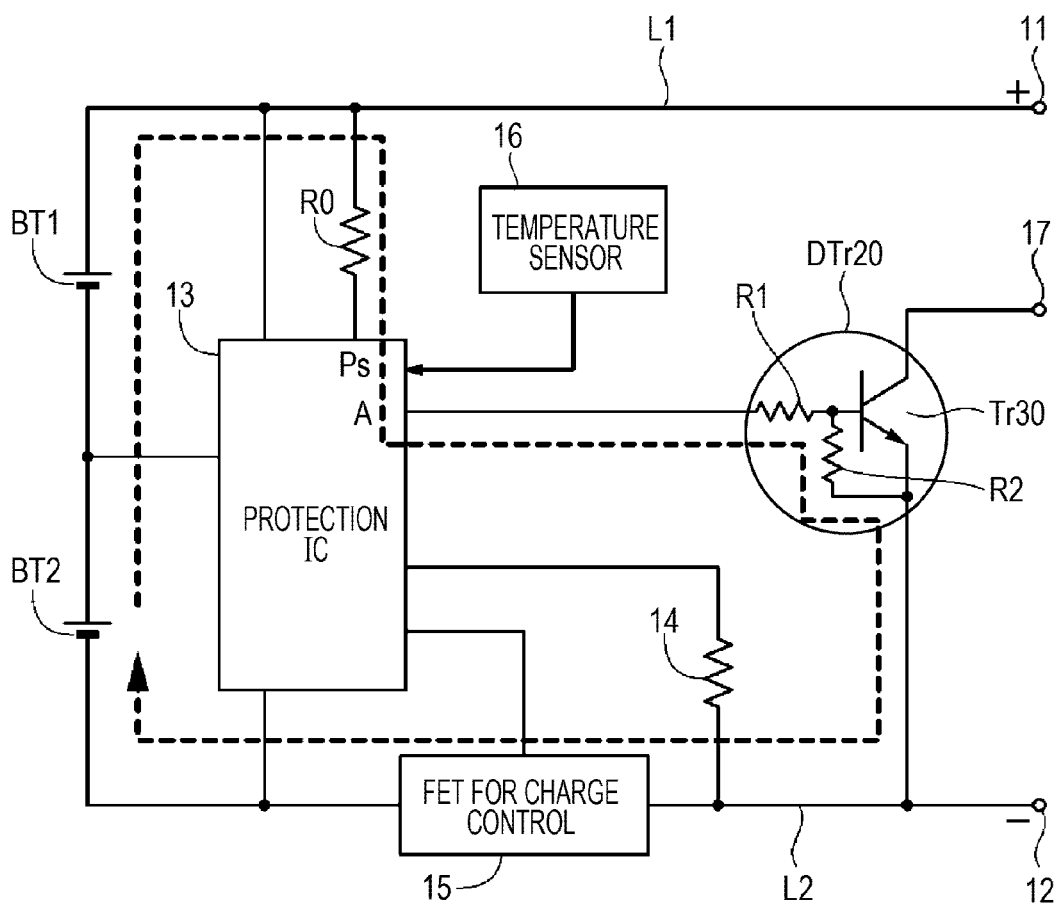
FIG. 1 is a block diagram illustrating a configuration of a battery pack according to a first embodiment.

FIG. 1 illustrates an example of a main configuration of a battery pack according to a first embodiment. In the battery pack, two battery cells BT1 and BT2 (when it is not necessary to distinguish the battery cells, it is simply referred to as a battery cell BT) are connected in serial. The battery cell BT, for example, is a lithium ion secondary battery. If a full charge voltage of a battery cell BT is 4.2 V, which is a voltage of the lithium ion secondary battery, the full charge voltage of the battery pack 1 is 8.4 V.

The battery cell BT is not limited to the lithium ion secondary battery and may be other secondary battery such as the lithium ion polymer and the like. In addition, the number of battery cell BT is not limited to two. One or more battery cell BT may be included in one battery package. A connection configuration of the battery cell BT may be suitably changed. A plurality of battery cells BT may be connected in parallel. Serially connected plurality of battery cells BT may be connected in parallel. The number or the connection configuration of the battery cell BT may be changed according to application of the battery pack.

Between a positive electrode of the battery cell BT1 and a positive terminal 11 of the battery pack, a positive line L1 is disposed. Between negative electrode of a battery cell BT2 and a negative terminal 12, a negative line L2 is disposed. An external device (load), which is powered by the battery pack 1, is connected to the positive terminal 11 and the negative terminal 12. When the battery pack 1 is charged, a battery charger is connected to the battery pack 1.

The battery pack 1 includes a protection integrated circuit (IC) 13. The protection IC 13 is integrated with a central process unit (CPU), a memory device and the like. In addition, the protection IC 13 may be a ROM type IC which is fabricated with the desired data permanently stored in it and not rewritten. The protection IC 13 has a function measuring a voltage across the terminals of each battery cell BT1. If a plurality of battery BT is connected, the protection IC 13 measures voltages across the terminals of each battery cell BT. In this embodiment, the protection IC 13 measures each a voltage across of the battery cell BT1 and a voltage across the battery cell BT2. In this case, the protection IC 13 also detects an over current in the battery pack 1 by an over current detection resistor 14.

The protection IC 13 is formed with a plurality of terminals (pins). A terminal used according to an application is defined. For example, a terminal used for detection of the voltage across terminals of the battery cell BT and a terminal used as a power supply for operating the protection IC 13 are defined. The protection IC 13 is operated using voltage of the battery cell BT1 and the battery BT2. A voltage of the battery cell BT1 and BT2 is converted by a regulator (not shown) and a power supply voltage for operating the protection IC 13 is produced. The produced power supply voltage is input to a predetermined terminal of the protection IC 13. In order to operate power of the battery pack BT using the voltage of the battery cell BT, for example, the battery pack 1 is separated from a load and the IC 13 is operated even if the battery pack 1 is not used.

The protection IC 13 is formed with the terminal Ps connected to the positive line L1. Between the positive line L1 and the terminal Ps, the resistor R0 is connected. In addition, the protection IC 13 is formed with the terminal A. The terminal Ps is used as the terminal for the power supply of the terminal A. The voltage of the battery cell BT is depressed by the resistor R0 and a predetermined voltage is produced. This predetermined voltage becomes a power supply of the terminal A. Further, there may be no resistor R0. Therefore, if a switching element between the terminal Ps and A terminal is short, the current can be limited by the resistor R0. Accordingly, it is preferable to provide the resistor R0.

In the inside of the protection IC 13, between the terminal Ps and the terminal A, the switching element (not shown) is connected. For example, the switching element is a field effect transistor (FET). A switching element connected between the terminal Pa and the terminal A is called a switching element S. The terminal Ps and the terminal A is connected by turning on the switching element S. If the switching element S is turned on, the current can flow into the inside of the protection IC 13 via the terminal Pa and the terminal A. For example, the battery cell BT can be discharged by flow of current via the terminal Ps and the terminal S. In a state in which the switch element S is turned off, the current flows between the terminal Ps and the terminal A.

A high logic level or a low control signal is output from the terminal A. The level of the control signal output from the terminal A is switched in response to the voltage of the battery cell BT1 and the battery cell BT2. For example, if the voltages of at least one of battery cell BT1 and the battery cell BT2 exceed a predetermined voltage, the signal level inputted from the terminal A is switched to the high level. The signal of the high level is output from the terminal A. That is, the terminal A is used as a terminal from which a control signal is output and is used as the discharge line when the battery cell BT is discharged.

The FET 15 for a charge and discharge is connected to the negative line L2 between the negative electrode and the negative terminal 12 of the battery cell BT 2. The FET 15 for charge and discharge may be composed of an insulated gate bipolar transistor (IGBT) other than FET. The FET 15 for change and discharge is composed of FET for change control and FET for discharge. For example, an FET for the discharge control and an FET for the charge control is connected from the negative electrode of the battery cell BT2 in this order. ON/OFF of the FET for discharge control is controlled by the control signal supplied from the protection IC 13. ON/OFF of the FET for charge control is controlled by the control signal supplied from the protection IC 13.

A temperature sensor 16 measures the ambient temperature (temperature envelope) of the battery pack 1 (a battery cell BT). The ambient temperature of the battery pack 1, for example, is a temperature of the inside of the battery pack 1. Preferably, the ambient temperature may be a temperature in the vicinity of the battery pack 1. The temperature sensor 16 can be used in various sensors such as thermostats, a resistor temperature sensor 16, a semiconductor sensor and the like. Temperature information on the ambient temperature obtained by the temperature sensor is supplied to the protection IC 13. In addition, a function of the temperature sensor 16 may be incorporated into the protection IC 13.

A digital transistor DTr 20 is connected to a line derived from a terminal A of the IC 13. The digital transistor DTr 20 is a configuration that is equipped with NPN type transistor Tr 30, which is an example of a switching element S, a resistor R1 and a resistor R2.

A collector terminal of a transistor Tr 30 is connected to a communication terminal 17. An emitter terminal of the transistor Tr 30 is connected to the negative line L2. A resistor R1 acting as an input resistor is connected to a base terminal of the transistor Tr 30. A resistor R2 is connected between a base and an emitter of the transistor Tr 30 in parallel. One end of the resistor R1 is connected to the line between the resistor R2 and the base terminal. Other end of the resistor R2 is connected to the line between the emitter of the transistor Tr 30 and the negative line L2. As described below. The current is moved to the Register R1 and the Register R2 to perform a discharge process. Therefore, the resistor R1 and the resistor R2 is slightly set lower than a resistance value of the digital transistor.

A discharge line includes the positive line of the protection IC 13, the terminal Ps, the terminal A, the resistor R1, and the resistor R2. One example of the discharge line is shown in dotted line FIG. 1. At the time of discharge, the current is supplied to the protection IC 13 via the terminal Ps from the positive line L1. The current supplied to the protection IC 13 is output from the terminal A. The current output from the terminal A is supplied to the negative line L2 via the resistor R1 and the resistor 2. The current flows through the FET for the discharge control of the negative line L2 to perform the discharge process.

The digital transistor DTr 20 is turned on/off in response to a level of the control output from the terminal A. For example, if the control signals of a high level from the terminal A is input a base terminal of the transistor Tr 30, the transistor Tr 30 is turned on. A level of an electrical potential of the communication terminal 17, for example, is changed to the low level by turning on the transistor Tr 30 and a signal of the low level is output from the communication terminal 17. If the control signals of the low level from the terminal A is input to the base terminal of the transistor Tr 30, the transistor Tr 30 is turned off. By the transistor Tr 30 being turned on, the electrical potential of the communication terminal 17, for example, is changed to the high level and the control signal is output from the communication terminal 17.

The communication terminal 17 is a terminal performing the communication with an external device connected to the battery pack 1. The external device, for example, is a battery charger performing the discharge in response to the battery pack 1. The battery charger is connected to the battery pack 1 to perform the charge process. The battery charger monitors the level of signal supplied via the communication terminal 17. If the signal of the low level is supplied from the communication terminal 17, the charge process stops. In addition, the communication terminal for performing the communication according to a standard such as a system management bus (SMBus), a controller area network (CAN) and the like is disposed in the battery pack 1.

Function of Protection IC

The protection IC 13 has an overcharge protection function, an over discharge protection function and an over current protection function. In addition, the protection IC 13 has the discharge function in a high temperature and the discharge function in a normal temperature. First, the overcharge protection function will be described. The protection IC 13 monitors a voltage across terminals of the battery cell BT1 and the battery cell BT2 and turn off the FET for the charge control if at least one voltage across the terminals is higher than a predetermined value (for example, 4.270 V), the electrical current is blocked by turning off the FET for charge control. This function is an overcharge protection function.

The over discharge protection function will be described. The protection IC 13 monitors the voltage across the terminals of the battery cell BT, monitors the voltage across the terminals of the battery cell BT1 and the battery cell BT2, and turn off the FET of the discharger control if at least one battery voltage, for example, become an over current state of 1.5 V to 2 V. The discharge current is blocked by turning off the FET for the discharge control. The function thereof is the over discharge protection function.

The over current protection function will be described. If the positive terminal and the negative terminal of the battery are short, a larger current may flow, therefore, there may be a risk of an abnormal heating. In addition, the protection IC 13 detects the current using the over current detection resistor 14 and turns off the FET of the discharge control if the discharge current is equal to or higher than any current value. The discharge current is blocked by turning off the FET for the discharge control. The function is the over current protection function.

Figure 2:
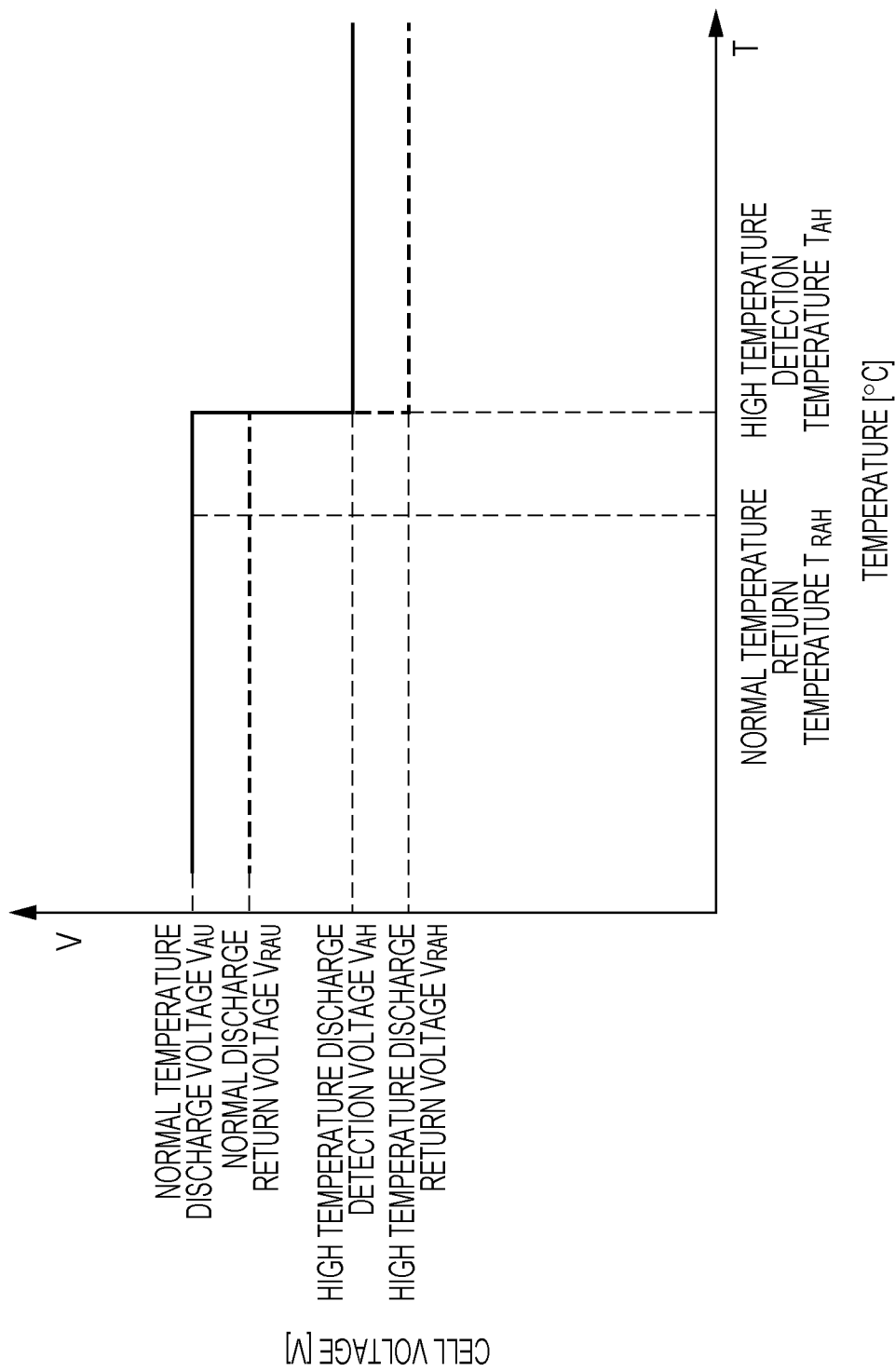

The protection IC 13 has a function performing a first discharge process discharging the battery cell BT in a high temperature state. Further, the protection IC 13 has a function performing a second discharge process discharging the battery cell BT in a normal temperature. Before describing the first discharge process and the second discharge process, a setting example of a threshold value for determining the normal temperature state and the high temperature state, and a setting example of a detection voltage and a return voltage will be described with reference to FIG. 2. A horizontal axis in FIG. 2 shows temperature and a vertical axis shows a voltage for each battery cell BT1. As described above, the temperature is measured by the temperature sensor 16 and the voltage is measured by the protection sensor IC 13. In addition, the measurement of the temperature and the voltage, for example, are periodically conducted.

As shown in FIG. 2, a high detection temperature $T_{AH}$ is set as an example of a first predetermined temperature. Temperature $T_{AH}$ of the high temperature detection is set to 45° C. If a high detection temperature $T_{AH}$ is more than 45° C. the protection IC 13 is determined as the high temperature state and if a high detection temperature $T_{AH}$ less than 45° C. The protection IC 13 is determined as the normal temperature state. In addition, the normal temperature return temperature $T_{RAH}$ is set as an example of a second predetermined temperature. That is, the normal temperature return temperature $T_{RAH}$ to 40° C. A hysteresis is kept at the detection temperature and the return temperature, so that an operation of the protection IC 13 can be prevent from being instable. As an example of a first voltage, the high temperature discharge detection voltage $V_{AH}$, for example, is set to 4.090 V. In addition, as an example of the second voltage, the high temperature discharge return voltage $V_{RAH}$ is set to, for example, 3.900 V.

As an example of a third voltage, the normal temperature discharge detection voltage $V_{AU}$ is set. The normal temperature discharge detection voltage $V_{AU}$ is set to 4.240 V, for example. In addition, a voltage at which the overcharge detection function is operated is set to a voltage high the normal temperature discharge detection voltage $V_{AU}$ (for example, 4.270 V). Further, as an example of a fourth voltage, the normal temperature discharge return voltage $V_{RAU}$ is set. The normal temperature discharge return voltage $V_{RAU}$ is to 4.050 V. In addition, a magnitude correlation of the power illustrated in FIG. 2 is an example. For example, if the above-mentioned voltage value is set, the high temperature discharge detection voltage value $V_{AH}$ is higher than the normal temperature discharge return voltage $V_{RAU}$.

In a high state, if a voltage of a least one battery cell BT is higher than the high temperature discharge detection voltage $V_{AH}$ and in the normal temperature state, a voltage of at least one battery cell BT is higher than the normal temperature discharge detection voltage $V_{AU}$, the protection IC 13 outputs the control signal of the high level from the terminal A. The transistor Tr 30 of the digital transistor DTr 20 is turned on by the control signal of the high level from the terminal A. The level of the electrical potential of the communication terminal 17 is changed to a low level by turning on transistor Tr 30. The signal of the low level from the communication terminal 17 is supplied to the charger as an alarm signal.

The charger receiving the alarm signal stops the charge process. Therefore, there is a case where the charge process does not stop without the charger recognizing the alarm signal by a specification and defectiveness. Generally, in a high temperature, if the voltage is slightly high, swelling of the battery BT can easily occur. Therefore, if a temperature is higher than 45° C. and the swelling easily occurs and the voltage of the battery cell BT is higher than the high temperature discharge detection voltage $V_{AH}$, the protection IC 13 performs first discharge process that discharges the battery cell BT until the battery cell BT become the high temperature discharge return voltage $V_{RAH}$.

In a normal state, deterioration of the performance of the battery cell BT does not easily occurs even if the voltage of the battery cell BT is high state. Accordingly, for example, if the voltage of the battery cell BT is charged between 4.240 V to 4.300 V, the performance of the battery cell BT is deteriorated, and a lifetime of the battery cell BT decreases. By setting the normal temperature discharge detection voltage $V_{AU}$, for example, up to 4.240 V, when the battery cell BT is discharged up to 4.240 V, it is possible to supply the alarm signal to the charger. Therefore, as described above, there is a case where the voltage of the battery cell BT, for example, is charged up to about 4.240 V to 4.300 V. When the battery cell is charged up to 4.270 V, the overcharge detection function described above is operated, but, for example, the battery cell is charged to about 4.250 V, the over current detection function is not operated. As described above, when the battery pack which the battery BT is discharged up to about 4.250 V is not used in the normal state, it is necessary to discharge the battery cell BT.

Herein, when the protection IC 13 is lower than 45° C., and the voltage of the battery cell BT is higher than the normal temperature discharge detection voltage $V_{AU}$, the second discharge process is being performed, which discharges the battery cell BT until the battery cell BT become a normal temperature discharge return voltage $V_{RAU}$ Even in the normal temperature state, the battery cell BT can be discharged and the voltage of the battery cell BT can decrease up to the normal temperature return discharge voltage $V_{RAU}$ of the battery cell BT by the second discharge process.

When the first and second discharge process is being performed, the protection IC 13 turns on the switching element S between the terminal Ps and terminal A. In this case, for example, the FET for the discharge control is turned on and the FET for the charge control is turned on. The current from the battery cell BT passes through the inside of the protection IC 13 via the terminal Ps from the positive line L1 and is output from the terminal A of the protection IC 13. In addition, the current flows into the negative line L2 via the resistor R1 and the resistor R2 of the digital transistor DTr 20. Further, the current flows into the negative electrode of the battery cell BT via the FET for the discharge control.

When the voltage of the battery cell BT is decreased to the high temperature discharge return voltage $V_{RAH}$, or the normal temperature discharge return voltage $V_{RAU}$, the discharge process is terminated. For example, the discharge process is terminated by turning off the switching element S between the terminal Ps and the terminal A. The discharge process may be terminated by turning off the FET of the discharge control.

In addition, for example, when the discharge process is being performed on the protection IC 13 based on only the normal temperature discharge detection voltage $V_{AH}$, and the voltage of the battery cell BT is in the vicinity of the high temperature discharge detection voltage $V_{AH}$ of the battery cell BT, there is a possibility that the level of the control signal output by the protection IC 13 is very often switched. In addition, the protection IC 13 very often performs the operation executing a start and stop. Therefore, the operation of the protection IC 13 can be prevented from being instable by setting the high temperature discharge detection voltage $V_{AH}$ having the hysteresis with respect to the high temperature discharge detection voltage $V_{AH}$. Therefore, the normal temperature discharge return voltage $V_{RAU}$ having the hysteresis is set to the normal temperature discharge detection voltage $V_{AU}$.

The first discharge process and the second discharge process may be performed in a state which the battery pack 1 is connected to the external device such that the charger and the like may be performed in a state separated from the external device. Even if the external device is separated, the battery pack 1 can be self-discharged. Since the battery pack 1 is self-discharged, a swelling or gas of the battery pack 1 is generated, thereby preventing deterioration of battery pack 1. For example, the deterioration due to metal extraction and the like of the battery cell BT can be prevented.

The discharge process can be performed before the battery cell BT is swelled by suitably setting the high temperature detection discharge voltage $V_{AH}$ and the normal temperature discharge detection voltage $V_{AU}$. Therefore, it is not necessary to provide an element and the like for detecting change in pressure according to swelling of the battery cell BT. In order to complete the discharge process using the battery pack 1, the discharge process of the battery pack 1 is not dependent on the process of the external device.

In order to measure the voltage of the battery cell BT, it is not necessary to discharge the battery cell BT more than necessary. For example, the battery cell BT can be prevented from being discharged more than necessary by suitably setting the normal temperature discharge return voltage $V_{RAU}$.

Since the digital transistor DTr 20 in the battery pack 1 is miniaturized, what the battery pack 1 becomes bigger is prevented. Further, the discharge process is being performed using the known line for performing communications. Therefore, it is not necessary to add an improved discharge circuit.

Processing

Figure 3:
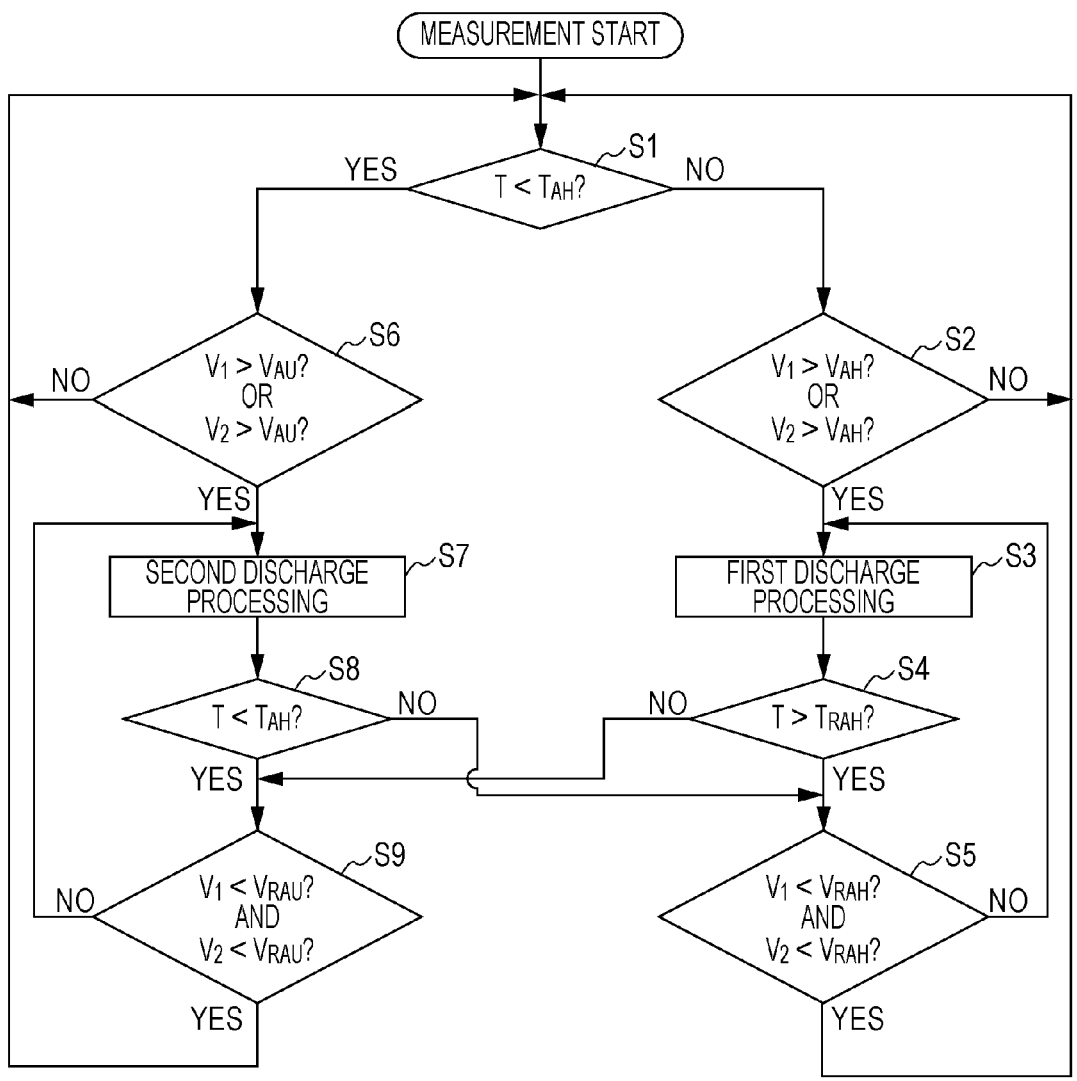
FIG. 3 is a flowchart illustrating an example of a discharge process.

The process will be described with reference to a flowchart in FIG. 3. The process illustrated in FIG. 3 is performed by the protection IC 13 if it is desirable. In addition, a denotation referring to a magnitude correlation representing a large size and a small size includes a case where is set to be above and below with respect to a reference and a case that is set to be larger and below with respect to a reference. A denotation referring to a high and low relation of the temperature is the same.

First, temperature information T measured by the temperature sensor 16 is supplied to the IC 13. In process in step S1, it determined whether the temperature information is lower than the high temperature detection temperature $T_{AH}$. If the temperature information T is higher than the high temperature detection temperature $T_{AH}$, it is determined that it is the high state. If it is the high state, the process proceeds to step S2. If it is determined that the high temperature information T is lower than the high detection temperature $T_{AH}$, it is determined that it determines the normal temperature state. If the temperature information is the normal temperature state, the process proceeds to step S6.

In step S2, it is determined that a voltage $V_1$ of the battery BT1 is higher than the high temperature discharge detection voltage $V_{AH}$. In addition, it is determined whether a voltage $V_2$ of the battery cell BT2 is higher than the high discharge detection voltage $V_{AH}$. If at least one of the voltage $V_1$ and the voltage $V_2$ is higher than the high temperature discharge detection voltage $V_{AH}$, for example, and either the voltage $V_1$ or the voltage $V_2$ is higher than the high temperature discharge detection voltage $V_{AH}$, the process proceeds to step S3. If the voltage $V_1$ and the voltage $V_2$ is lower than the high temperature discharge detection voltage $V_{AH}$, the process returns to step S1.

In step S3, the control signal of the high level is output from the terminal A and the digital transistor DTr 20 is turned on. In addition, if a determination in step S2 is positive, the control signal of the high level is output from the terminal A regardless of whether the battery pack 1 is connected to the charger. In addition, step S3, the first discharge process, for example, the switching element S between the terminal Ps and A is turned on. The FET for the charge control and the FET for discharge control, for example, are turned on. In this case, the discharge line described below is formed and the first discharge process is completed by the flow of the current into the discharge line. In addition, the current flows into the discharge line and the current flows into the protection IC 13 from the terminal Ps to the terminal A.

Discharge Line

Battery cell BT (positive electrode)→Terminal Ps→Terminal A→Resistor R1→Resistor R2→Discharge control FET→Battery cell BT (negative electrode)

In step S3, when the first discharge process is made, in step S4, the determination on the temperature information T is made in parallel. In step S4, it is determined whether the temperature information T is higher than the normal temperature return temperature $T_{RAH}$. If the temperature information T is higher than the normal temperature return temperature $T_{RAH}$, in step S5, the first discharge process is continuous.

In addition, in step S4, the temperature T may be compared with the high temperature detection temperature $T_{AH}$. However, if a temperature measured by the temperature sensor 16 fluctuates to the vicinity of the high temperature detection temperature $T_{AH}$, the operation of the protection IC 13 become instable. Accordingly, the normal temperature detection temperature $T_{RAH}$ having the hysteresis is set to the high temperature detection return temperature $T_{AH}$.

In step S5, it is determined whether the voltage $V_1$ and the voltage $V_2$ are lower than the high temperature discharge return voltage $V_{RAH}$. If the voltage $V_1$ and the voltage $V_2$ is not lower than the high temperature discharge return voltage $V_{AH}$, the process returns to step S5, and the first discharge process is terminated. If voltage $V_1$ and voltage $V_2$ is lower than the high temperature discharge return voltage $V_{RAH}$, the first discharge process is terminated. For example, the switching element S between the terminal A and the terminal Ps is turned off. The FET for the discharge control may be turned off. In this case, the discharge line described above is blocked and the discharge from the battery cell BT stops. Further, the process returns ton step S1.

In addition, in step S5 it may be determined whether the voltage $V_1$ and the voltage $V_2$ are lower than the high temperature discharge return voltage $V_{AH}$. Therefore, whether the voltage $V_1$ and the voltage $V_2$ is a voltage in the vicinity of the high temperature discharge detection voltage $V_{AH}$, the operation of the protection IC 13 becomes unstable. For example, the operation of the protection IC 13 frequently switches and outputs the control signal of the low or high level. Therefore, the operation of the external device connected via the communication terminal 17 becomes unstable. In order to prevent such a circumstance, the high temperature discharge return voltage $V_{RAH}$ having the hysteresis with respect with the high temperature discharge detection voltage $V_{AH}$ is set.

The process when it is determined that it is the normal state will be described in step S1. In step S6, it is determined whether the voltage $V_1$ of the battery cell BT1 is higher than the normal discharge detection voltage $V_{AU}$. In addition, it is determined whether the voltage $V_2$ of the battery cell BT2 is higher than the normal discharge detection voltage $V_{AU}$. If at least one voltage of the voltage $V_1$ and the voltage $V_2$ is higher than the normal discharge detection voltage $V_{AU}$, the process returns to step S7. If the voltage of the voltage $V_1$ and the voltage $V_2$ is lower than the normal temperature discharge detection voltage $V_{AU}$, the process return to step S1.

In step S7, the control signal of the high level from the terminal A is output and the digital transistor DTr 20 is turned on. In addition, if the determination of step S6 is positive, the control signal of the high level from the terminal A is output regardless of the fact whether the battery pack 1 is connected to the charger. Further, in step S7, the second discharge process is achieved. In the second discharge process, for example, the switching element S of the terminal Ps and the terminal A is turned on. The FET for the charge control and the FET for the discharge control, for example, is turned on.

Therefore, the above-mentioned discharge line is formed and the current flows into the discharge line.

In step S7, the determination on the temperature information T in step S8 is made in parallel while the second discharge process is made. The determination in step S8 has the same contents of the determination in step S1. If it is not changed to the high temperature state, that is, in step S8, if it is determined that it is positive, the process proceeds to step S9. In addition, if the temperature information T is higher than the high temperature detection temperature $T_{AH}$, it is necessary to discharge the battery cell BT rapidly. Therefore, in step S8, the high temperature detection temperature $T_{AH}$ is referenced.

In step S9, it is determined whether the voltage $V_1$ and the voltage $V_2$ are lower than the normal discharge return voltage $V_{RAU}$. If the voltage $V_1$ and the voltage $V_2$ is not lower than the normal temperature discharge return voltage $V_{RAU}$, the process returns to step S7, and the second discharge process is continuous. For example, if the voltage $V_1$ and the voltage $V_2$ are lower than the normal temperature discharge return voltage $V_{RAU}$, the second discharge process is terminated. For example, the switching element S between the terminal Ps and the terminal A may be turned off. Accordingly, the FET for the discharge control may be turned off. In this case, the discharge line described above is blocked and the discharge from the battery cell BT stops. In addition, the process returns to step S1.

In determination in step S4, if the temperature information T is not higher than the normal temperature return temperature $T_{RAH}$, and the process proceeds to step S9. In step S9, the process described above is achieved, it is determined whether the voltage $V_1$ and the voltage $V_2$ is lower than the normal temperature discharge return voltage $V_{RAU}$. If the voltage $V_1$ and the voltage $V_2$ are not lower than the normal temperature discharge return voltage $V_{RAU}$, the process returns to step S7 and the second discharge process is being performed. If the voltage $V_1$ and the voltage $V_2$ are lower than the normal temperature return voltage $V_{RAU}$, then process returns to step S1.

In the determination in step S8, if the temperature information T is not lower than the high temperature detection temperature $T_{AH}$, the process proceeds to S5. In step S5, the above-mentioned process is achieved and it is determined whether the voltage $V_1$ and the voltage $V_2$ is lower than the high temperature discharge return voltage $V_{RAH}$. When the voltage $V_1$ and the voltage $V_2$ is higher than the high temperature discharge return voltage $V_{RAH}$, the process returns to S3 and the first discharge is performed. If the voltage $V_1$ and the voltage $V_2$ is lower than the high temperature discharge return voltage $V_{RAH}$, the process returns to step S1.

2. Second Embodiment

Figure 4:
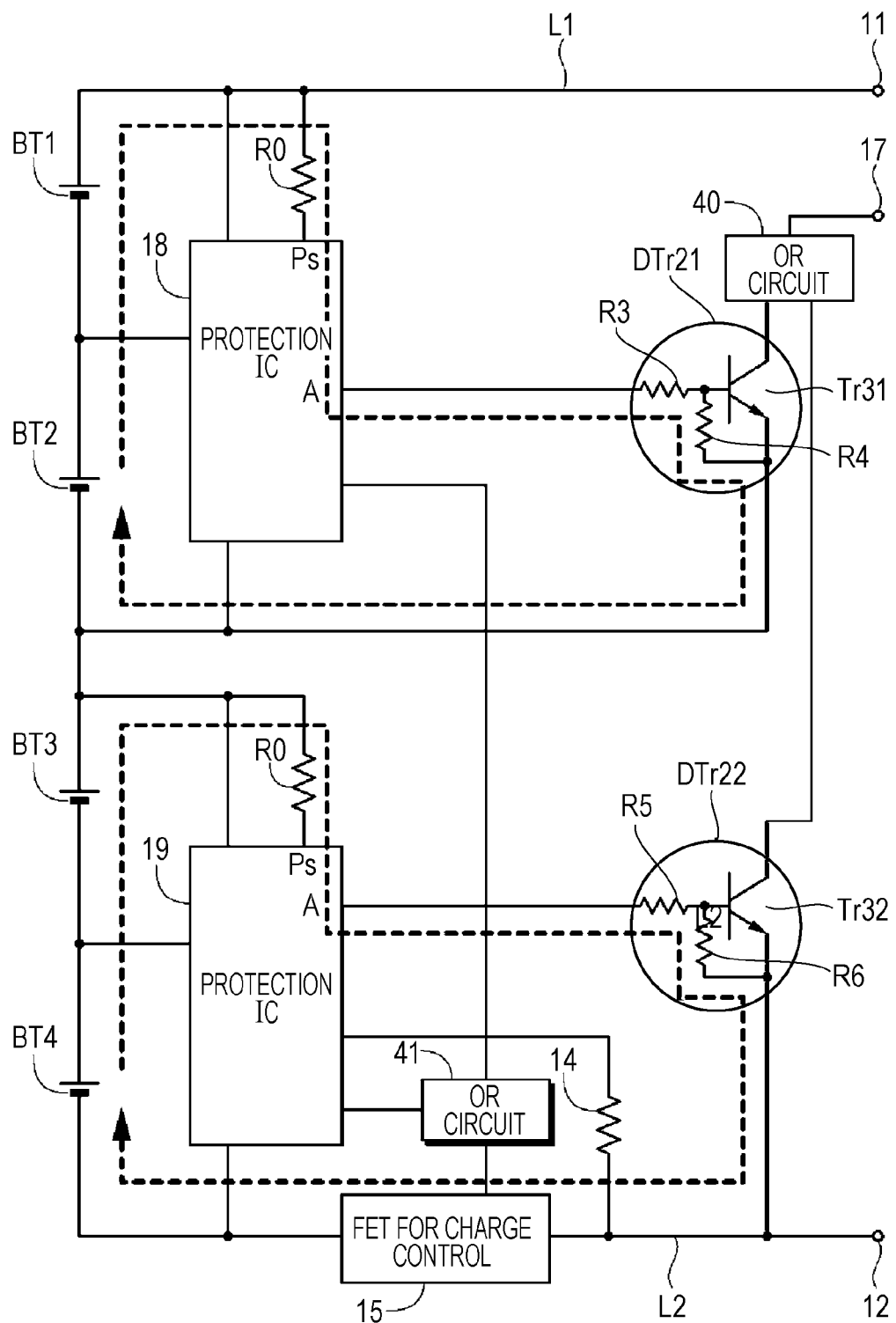
FIG. 4 is a block diagram illustrating a configuration of a battery pack according to a second embodiment.

Next, a second embodiment will be described. FIG. 4 is a configuration example of the battery pack 2 according to the second embodiment. In the configuration of the battery pack 2, the same reference numerals are used for the same elements as the battery pack 1 and the redundant descriptions are omitted.

The battery pack 2 has four battery cell BT1, BT2, BT3 and BT4 connected in series. The battery pack 2 has for example, two protections IC 18, 19. The protection IC 18 monitors the voltage of the battery BT1 and the battery BT2. The protection IC 19 monitors the voltage of the battery cell BT3 and the battery cell BT4. The protection IC 18 and the protection IC 19 have each terminal Ps and the terminal A.

The terminal A of the protection IC 18 is connected to the digital transistor DTr 21. The digital transistor DTr 21 is equipped with a transistor Tr 31, a resistor R3 and a resistor R4. The resistor R3 is connected to a base terminal of the transistor Tr 31. The resistor R4 is connected in parallel between the base and the emitter. A collector terminal of the transistor Tr 31 is connected to OR circuit 40.

The terminal A of the protection IC 19 is connected to the digital transistor DTr 22. The digital transistor DTr 22 is equipped with a transistor Tr 32, a resistor R5 and a resistor R6. The resistor R5 is connected to a base terminal of the transistor Tr 32. A resistor R6 is connected in parallel to the base-emitter. A collector terminal of the transistor Tr 32 is connected to an OR circuit 40.

The digital transistor DTr 21 is turned on by a signal of a high level output from the terminal A of the protection IC 18. The digital transistor DTr 22 is turned on by a signal of a high level output from the terminal A of the protection IC 19. When least one digital transistor DTr is turned on, the control signal of a low level is output the communication terminal 17 in response to an operation of the OR circuit 40.

The protection IC 18 and the protection IC 19 are connected to the OR circuit 41. An over current detection resistor 14 is detected in the protection IC 19. If an over current is detected by the protection IC 19, the protection IC 19, for example, outputs the control signal of the low level which, turns off the FET for the discharge control. The control signal of the low level is supplied to the FET 15 for the charge and discharge control via the OR circuit 41. The FET for the discharge control is turned on by the control signal of the low level.

If any battery BT become over current state, at least one of the protection IC 18 and the protection 19 outputs the control signal turning off the FET for the charge control. For example, the control signal of the low level is output from at least one of the protection IC 18 and the protection IC 19. The OR of the output from the protection IC 18 and the protection IC 19 is determined by the OR circuit 41. The control signal according to a determination result is output from the OR circuit 41. That is, if the control signal of the low level is supplied from at least one of the protection IC 18 and the protection IC 19, the control signal of the low level is output from the OR circuit 41. A control signal of low level output is supplied to the FET for charge control. The FET for the charge control is turned off by the control signal of the low level, and the over current prevention function is operated, The battery pack 2 according to a second embodiment can perform a discharge process for each block. For example, the block 1 is formed by the battery cell BT1 and the battery cell BT2. The block 2 is formed with the battery block BT3 and the battery cell BT4. The protection IC 18 performs a first and a second discharge process described above with respect to the block 1 composed the battery cell BT1 and the battery cell BT2. The protection IC 19 performs the first and second discharge disclosed above on a block 2 composed the battery cell BT3 and the battery cell BT4. In FIG. 4, an example of the discharge line in each block is shown in a dotted line. In addition, the contents of the first and second discharge processes are the same as those of the processes described in FIG. 3 and thus the repeated description is omitted.

The battery pack 2 according to a second embodiment can be discharged for each block and performs only discharge process of a selected block. For example, if the voltage of the battery cell BT is varied, it may be necessary to discharge only the selected block even if the battery pack 2 is not used under a high temperature.

3. Modification

Though a plurality of embodiments according to the present disclosure was discharged, the present disclosure is not limited to the embodiment of the present disclosure described above. A plurality of modification will be described below.

Figure 5:
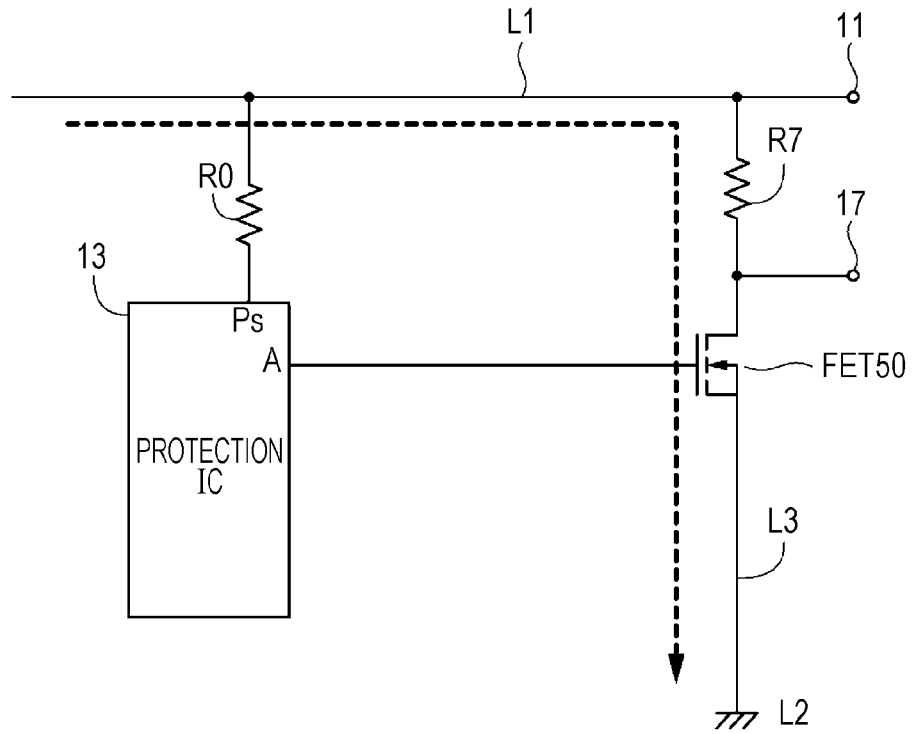
FIG. 5 is a schematic diagram illustrating a discharge line according to a modification.

FIG. 5 illustrates a configuration example of a first modification of a discharge circuit. In addition, a portion of FIG. 5 is omitted to simplify illustration. A GND in FIG. 5 corresponds to a negative line L2. In a first modification, a line L3 is disposed between the positive line L1 and the negative line L2. The resistor R7 and FET 50 is connected to line L3 from the positive line L1 side in this order. A communication terminal 17 is connected between the resistor R7 and the FET 50 for discharge.

As described above, when a first or second discharge process is being performed, the control signal of a high level is output from the terminal A. The FET 50 is turned on by the control signal of the high level. A current flowing into the positive line L1 flows to the negative line L2 via the resistor R7 and the FET 50 and the discharge process is being performed by turning on the FET 50. As described above, the discharge line that does not pass through the inside of the protection IC 13 is formed and the discharge process may be performed by the flow of the current to the discharge line. Since a large current does not flow into the inside of the protection IC 13, the larger current flows into the discharge line and the battery cell BT can be discharged rapidly.

Figure 6:
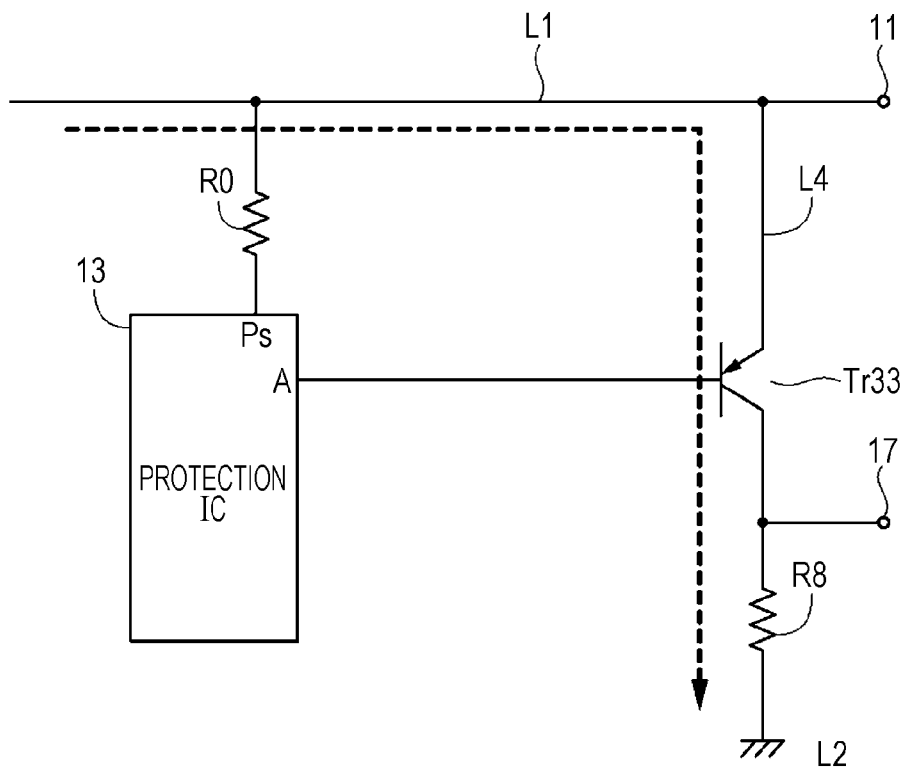
FIG. 6 is a schematic diagram illustrating a discharge line according to another modification.

FIG. 6 illustrates a configuration example of a second modification of the discharge circuit. In addition, a portion of FIG. 6 is omitted to simplify illustration. A GND in FIG. 6 corresponds to the negative line L2. A line L4 may be disposed between the positive line L1 and the negative line L2. A PNP type transistor Tr 33 and a resistor R8 for a discharge are connected to the line L4 from the positive line L1 in this order. A communication terminal 17 is connected between PNP type transistor Tr 33 and the resistor R8. When the first or second discharge process is being performed, the control signal of the low level is output from the terminal A. The PNP type transistor Tr 33 is turned on by the control signal of the low level.

The current flowing into the positive line L1 flows into the negative line L2 via the PNP type transistor Tr33 and the resistor R8 by turning on the PNP type transistor Tr 33 and the discharge process is being performed. Accordingly, then discharge line that the current does not pass through the inside of the protection IC 13 is formed and the discharge process may be performed by the flow of the current to the discharge line. Since the current does not flow to the inside of the protection IC 13, the large current flow into the discharge line and the battery cell BT is discharged rapidly.

Figure 7:
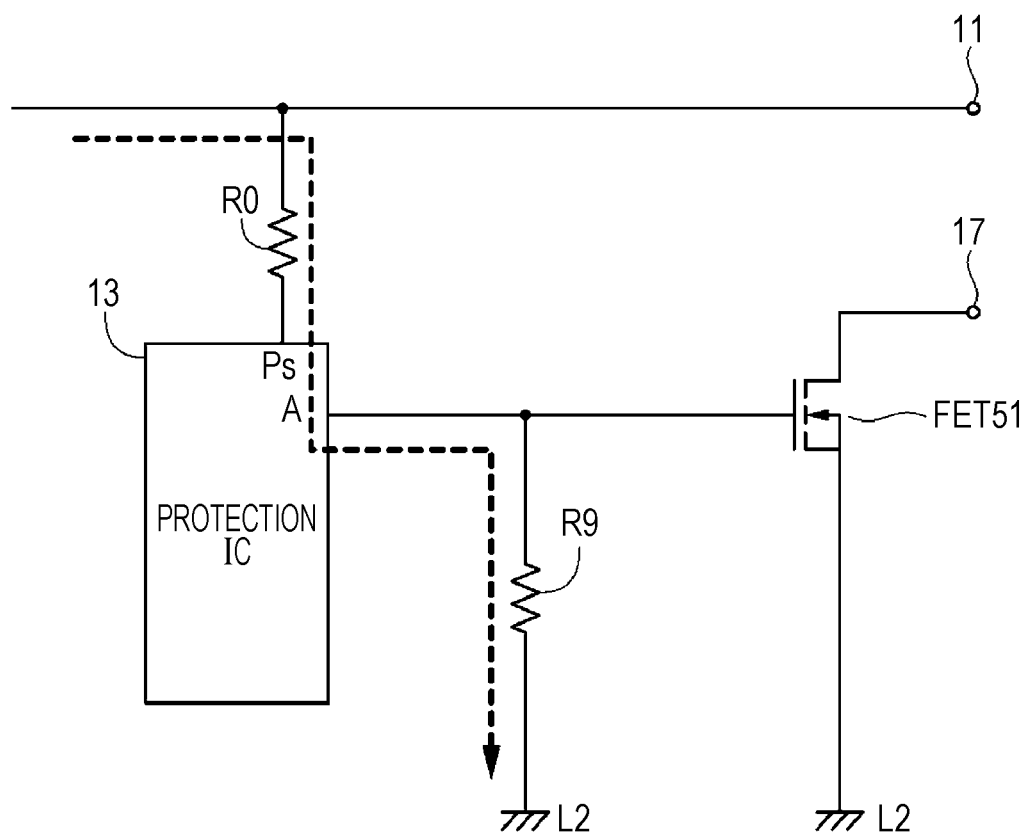
FIG. 7 is a schematic diagram illustrating a discharge line according to still another modification.

FIG. 7 illustrates a configuration example of a third modification of the discharge circuit. A portion of FIG. 7 is omitted to simplify illustration. A GND in FIG. 7 corresponds to a negative line L2. A third modification is an example that a digital transistor DTr 20 in a first embodiment is disposed in an FET 51, and a pull-down resistor R9 is connected between the terminal A and the FET 51. The FET 51 and pull-down resistor R9 is connected to each negative line L2.

When a first or a second discharge process is completed, the switching element S between the terminal A and the terminal Ps is turned on. A resistance value of the pull-down resistor R9 is suitably set, so that it is possible to flow the current to the pull-down resistor R9. As illustrated by a dotted line in FIG. 7, the current flowing from the positive line L1 flows into the resistor R9 via the terminal Ps and the terminal A. As described above, the discharge process may be performed by flowing the current to a resistor other than a resistor embodied in the digital transistor DTr.

Figure 8:
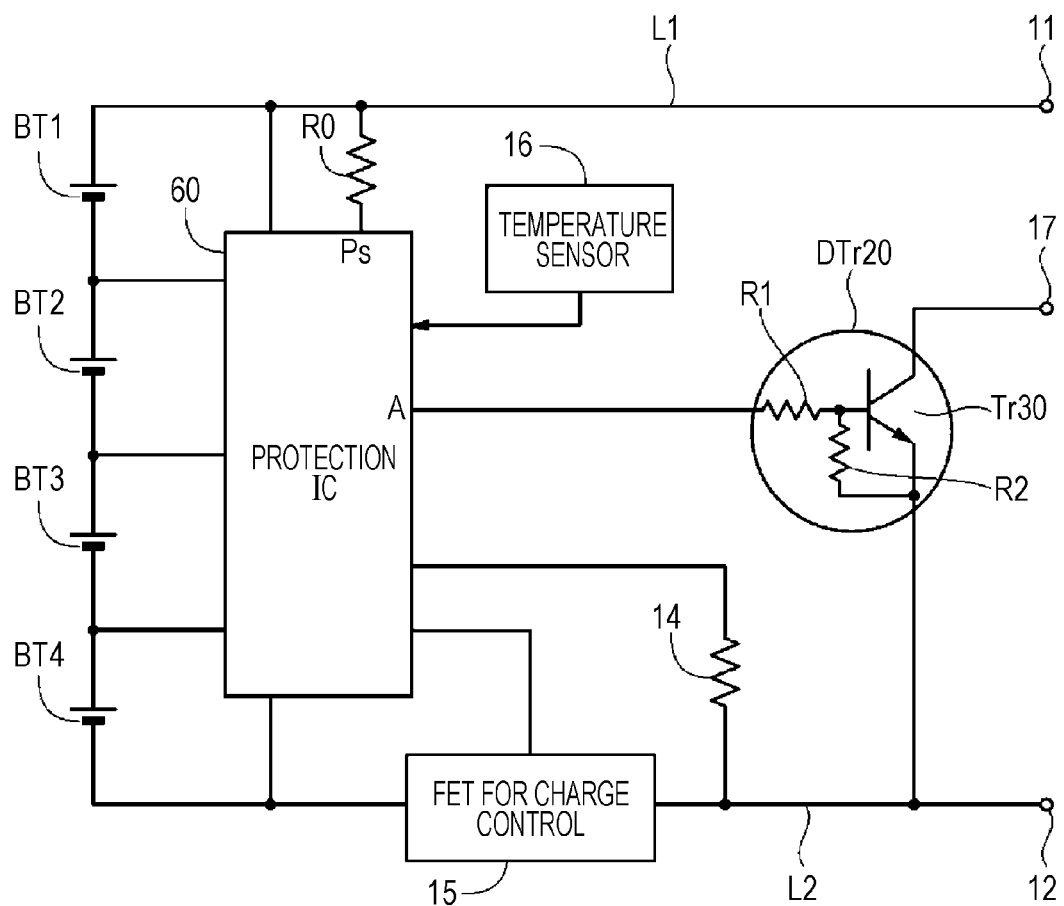
FIG. 8 is a schematic diagram illustrating a configuration of the battery pack according to a modification.

FIG. 8 illustrates other modification of the battery pack. The battery pack has the four battery cells BT1, BT2, BT3 and BT4 connected in serial. The protection IC 60 in the battery pack monitors the voltage of each battery cell BT. The process performed by the protection IC 60 is the same as the process performed by the protection IC 13. As described above, the number of a plurality of the battery cell BT is limited to two. The voltage of a plurality of battery cell BT can be monitored by one protection IC. Therefore, it is possible to reduce parts count.

The embodiment described above is a configuration in which the switching element S is disposed between the terminal Ps and the terminal A, but it may be a configuration in which the switching element S is disposed between the positive line L1 and the terminal Ps. The discharge process according to the embodiment described above is performed to discharge the plurality battery cell. However, the discharge line may be provided for each of the battery cells and only the battery cell that should be discharge, may be discharged individually.

The configuration, a numerical value and the like disclosed in the present disclosure is an example and can be changed in range in which a technical contradiction does not occur. The embodiment and the modification described above can suitably combined in a range in which the technical contradiction does not occur.

In addition, the present disclosure has the following configuration.

(1) There is provided a method of controlling discharge in a battery pack, including:

measuring an ambient temperature of a battery cell and a voltage of the battery cell;

a first discharge processing of discharging the battery cell until the voltage of the battery cell becomes a second voltage lower than a first voltage when the ambient temperature is higher than a first predetermined temperature and the voltage of the battery cell is higher than the first voltage; and a second discharge processing of discharging the battery cell until the voltage of the electrical battery cell becomes a fourth voltage lower than a third voltage when the ambient temperature is lower than the first predetermined temperature and the voltage of the battery cell is higher than the third voltage.

(2) The method of controlling discharge according to (1), wherein while the first discharge processing is performed, it is determined whether the ambient temperature is lower than a second predetermined temperature, while the second discharge processing is performed, it is determined whether the ambient temperature is lower than the first predetermined temperature, and the second predetermined temperature is lower than the first predetermined temperature.

(3) The method of controlling discharge according to (1) or (2), wherein the first discharge processing and the second discharge processing are performed by applying current to a discharge line, wherein the discharge line includes a positive line connected to a positive electrode of the battery cell, a negative line connected to a negative electrode of the battery cell, a first terminal connected to the positive line and disposed in a control section, a second terminal disposed in the control section and outputting a control signal having a different voltage level in response to a voltage of the battery cell, and a resistor connected between the second terminal and the negative line.

(4) There is provided a battery pack including:

a battery cell; and a control section to which information on an ambient temperature of the battery cell and information on a voltage of the battery cell are input, wherein the control section performs a first discharge processing of discharging the battery cell until the voltage of the battery cell becomes a second voltage lower than a first voltage when the ambient temperature is higher than a first predetermined temperature and the voltage of the battery cell is higher than the first voltage, and the control section performs a second discharge processing of discharging the battery cell until the voltage of the battery cell becomes a fourth voltage lower than a third voltage when the ambient temperature is lower than the first predetermined temperature and the voltage of the battery cell is higher than the third voltage.

(5) The battery pack according to (4), wherein, the control section determines whether the ambient temperature is lower than a second predetermined temperature, while the first discharge processing is performed, the control section determines whether the ambient temperature is lower than the first predetermined temperature while the second discharge processing is performed, and the second predetermined temperature is lower than the first predetermined temperature.

(6) There is provided a battery pack including:

a battery cell;

a positive line connected to a positive electrode of the battery cell;

a negative line connected to a negative electrode of the battery cell; and a control section to which information on an ambient temperature of the battery cell and information on a voltage of the battery cell are input and which has at least a first terminal connected to the positive line and a second terminal outputting a control signal having a different voltage level in response to a voltage of the battery cell; and a resistor connected between the second terminal and the negative line, wherein the control section performs a first discharge processing of discharging the battery cell until the voltage of the battery cell becomes a second voltage lower than a first voltage when the ambient temperature is higher than a first predetermined temperature and the voltage of the battery cell is higher than the first voltage, the control section performs a second discharge processing of discharging the battery cell until the voltage of the battery cell becomes a fourth voltage lower than a third voltage when the ambient temperature is lower than the first predetermined temperature, and the voltage of the battery cell is higher than the third voltage, and the first discharge processing and the second discharge processing are performed by applying current to a discharge line having the positive line, the first terminal, the second terminal, the resistor and the negative line.

(7) The battery pack according to (6), wherein the resistor is a resistor included in a switching element.

(8) The battery pack according to (7), wherein, the switching element is a digital transistor including a first resistor, a second resistor, and a transistor, wherein, the first resistor is connected between the second terminal and a base terminal of the transistor and, the second resistor is connected in parallel between a base terminal and an emitter terminal of the transistor.

(9) An electrical storage system, wherein the battery pack according to any one of (4) to (8) is charged by a power generator performing power generation based on a renewable energy source.

(10) An electrical storage system including the battery pack according to any one of (4) to (8) that wherein the system supplies electric power to electronic apparatus connected to the battery pack.

(11) An electronic apparatus receiving electric power from the battery pack according to any one of (4) to (8).

(12) An electric vehicle including:

a conversion device that receives electric power from the battery pack according to any one of (4) to (8) and converts the power into a driving force of the vehicle; and a control device that performs information processing related to vehicle control based on information related to the battery pack.

(13) A power system including a power information transmission and reception unit that transmits and receives signals to and from external apparatuses via a network, wherein the system performs charge and discharge control of the battery pack according to any one of (4) to (8) based on information received by the power information transmission and reception unit.

(14) A power system that receives electric power from the battery pack according to any one of (4) to (8) or supplying electric power to the battery pack from a generator or a power network.

4. Application Example

As described below, an application example of the battery pack will be described. However, the application example is not limited to an application example described blow.

Storage Battery in House as Application Example

Figure 9:
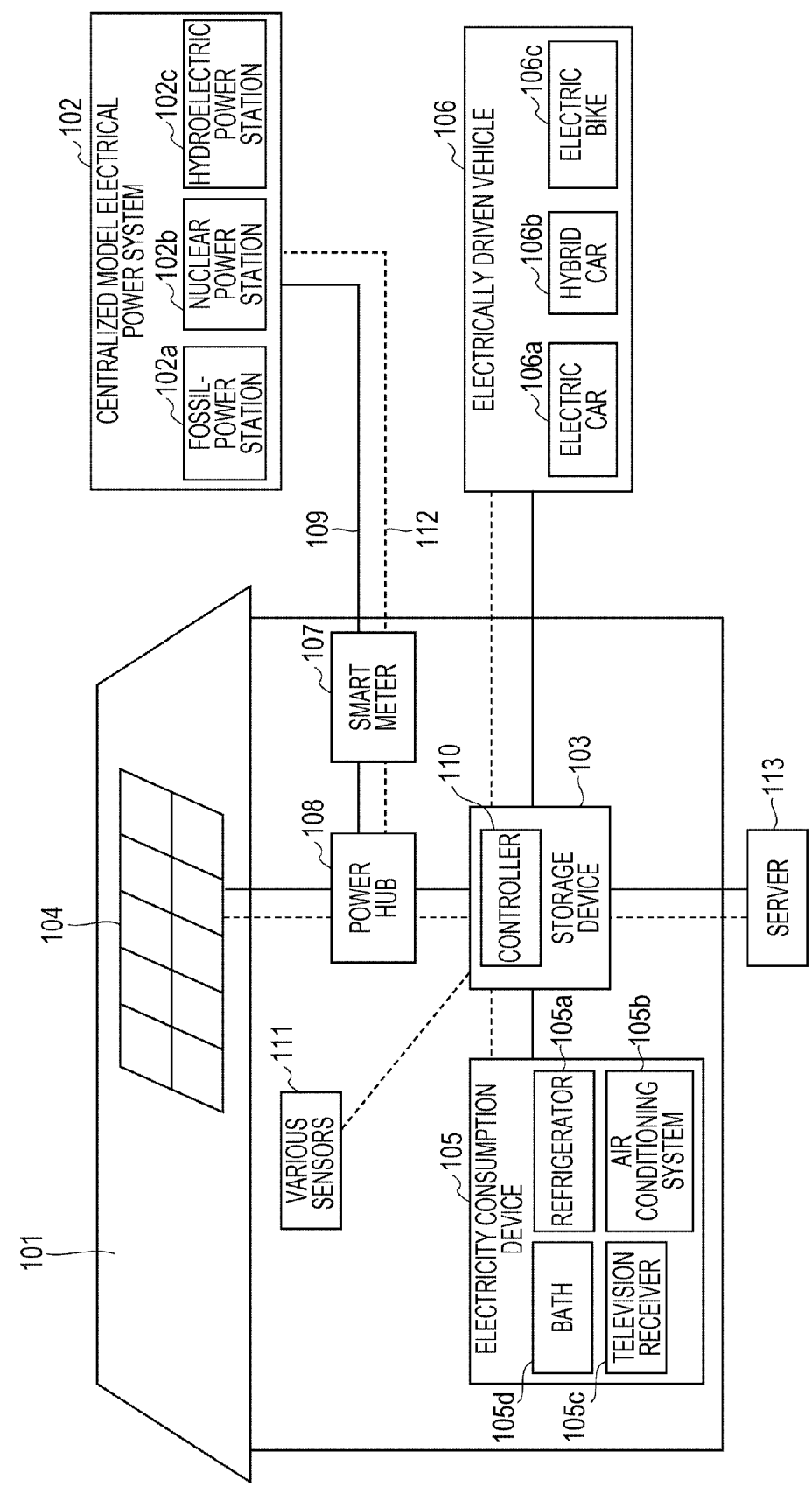
FIG. 9 is a block diagram illustrating an application of a battery pack.

An example applying the battery pack of the present disclosure to an electrical storage system for a house will be described with reference to FIG. 9. For example, in an electrical storage system 100 for the house 101, power is supplied to a storage device 103 from a centralized model electrical power system 102 such as a fossil-power station 102a, a nuclear power station 102b, a hydroelectric power station 102c via a power network 109, information network 112, a smart meter 107, a power hub 108 and the like. In addition, the electric power is supplied to from an independent source such as domestic electric power station 104 and the like to the storage device 103. Power is stored in the storage device 103. The electric power used in the house 101 is fed by utilizing the storage device 103. The same electrical storage system can be used for a building in addition to the house 101.

A controller for controlling the electric power plant 104, an electricity consumption device 105, a storage device 103, and a controller 110 for controlling each device, a smart meter 107 and a sensor 111 for obtaining various information, are disposed in the house 101. Each device is connected by a power network 109 and the information network 112. A solar battery, a fuel battery and a wind mill and the like is used as the electric power plant 104 and the generated electric power is supplied to the electricity consumption device 105 and/or the storage device 103. The electricity consumption device 105 has a refrigerator 105a, an air-conditioning system 105b, a television receiver 105c, a bath 105d and the like. In addition, the electricity consumption device 105 includes an electric vehicle 106. The electric vehicle 106 has an electric car 106a, a hybrid car 106b, and electric bike 106c. The electric vehicle 106 may be electrically assisted bicycles.

The storage device 103 is composed of a secondary battery or a capacitor. For example, the storage device is made of a lithium ion secondary battery. Even if the lithium ion secondary battery is a stationed type, it may be used at the electric vehicle 106. The battery pack described above is applicable to the storage device 103. The master meter 107 detects the amount of commercial power used and has a function transmitting the detected amount to an electrical power company. The power network 109 may be any one of DC power supply, AC power supply and a contact-less power transfer and the combination thereof.

Various sensors 111, for example, is a human presence sensor, a light sensor, an object detection sensor, a power consumption sensor, a vibration sensor, a contact sensor, a temperature sensor, an infrared sensor and the like. The information obtained by various sensors 111 is transmitted to a controller 110. A weather condition and human condition is grasped by the information from the sensor 111 to automatically control the electricity consumption device 105. Accordingly, it is possible to minimize energy consumption. The controller 110 can transmit information on the house 101 to the external electric power company and the like via the internetwork.

A process of branch of a power line, AC-DC conversion and the like is achieved by the power hub 108. A communication method of the information network 112 connected to the controller 110 is a method for using a communication interface such as a universal asynchronous receiver transmitter (UART) and the like, and a method for using a sensor network by wireless communication standard such as Bluetooth, ZigBee, Wi-Fi and the like. Bluetooth method is used for a multimedia communication and can perform communication of one-many connection. ZigBee uses a physical layer of Institute of Electrical and Electronics Engineers (IEEE) 802.15.4. IEEE802.15.4 is a name of a short-range wireless network standard called a personal area network (PAN) or W (wireless) PAN.

The controller 110 is connected to an external sever 113. The sever 113 may be controlled by any one of a house 101, an electric power company and a provider. The information transmitted and received by the sever 113, for example, is power consumption information, life pattern information, electricity rates, whether information, natural disaster information and power deal. The information described above may be received and transmitted from a power consumption device (for example, television receiver) and a device other than the home (for example, mobile phone). The information may be displayed in a device such as a display device, the mobile phone, personal digital assistants (PDA) and the like.

The controller 110 for controlling each device is composed of CPU, RAM, ROM and the like and is accommodated in the storage device 103 as one example. The controller 110 is connected by the storage device 103, the domestic power device 104, the electricity consumption device 105, various sensor 111, the sever 113 and the information network 112 and for example, has a function for adjusting the amount of commercial power used and an electric power generation. In addition, the controller may provide a function and the like for performing power transaction at power market.

As described above, the power can be stored not only in the centralized model electrical power system 102 such as such as a fossil-power station 102a, a nuclear power station 102b, a hydroelectric power station 102c, but also in the electrical storage device 103 of a generated power of the domestic power device 104 (a solar power generation, and a wind power generation). Therefore, even if the generated power of the domestic power device 104 is changed, the amount of the power transmitted to the outside is constant and discharge can be properly performed. For example, the power obtained at the solar power generation is stored in the storage device 103, power that the charge is low is stored in the storage discharge device in the night, and the power stored by the storage device 103, which charge of day time is high at time zone may be used.

In addition, in an example, though the example is described in which the controller 110 is accommodated in the storage device 103, it may be accommodated the smart meter 107 and may be configured independently. Further, the electrical storage system 100 may be used for a plurality of families and may be used in a detached house for housing.

Electrical Storage System in Vehicle of Application Example

Figure 10:
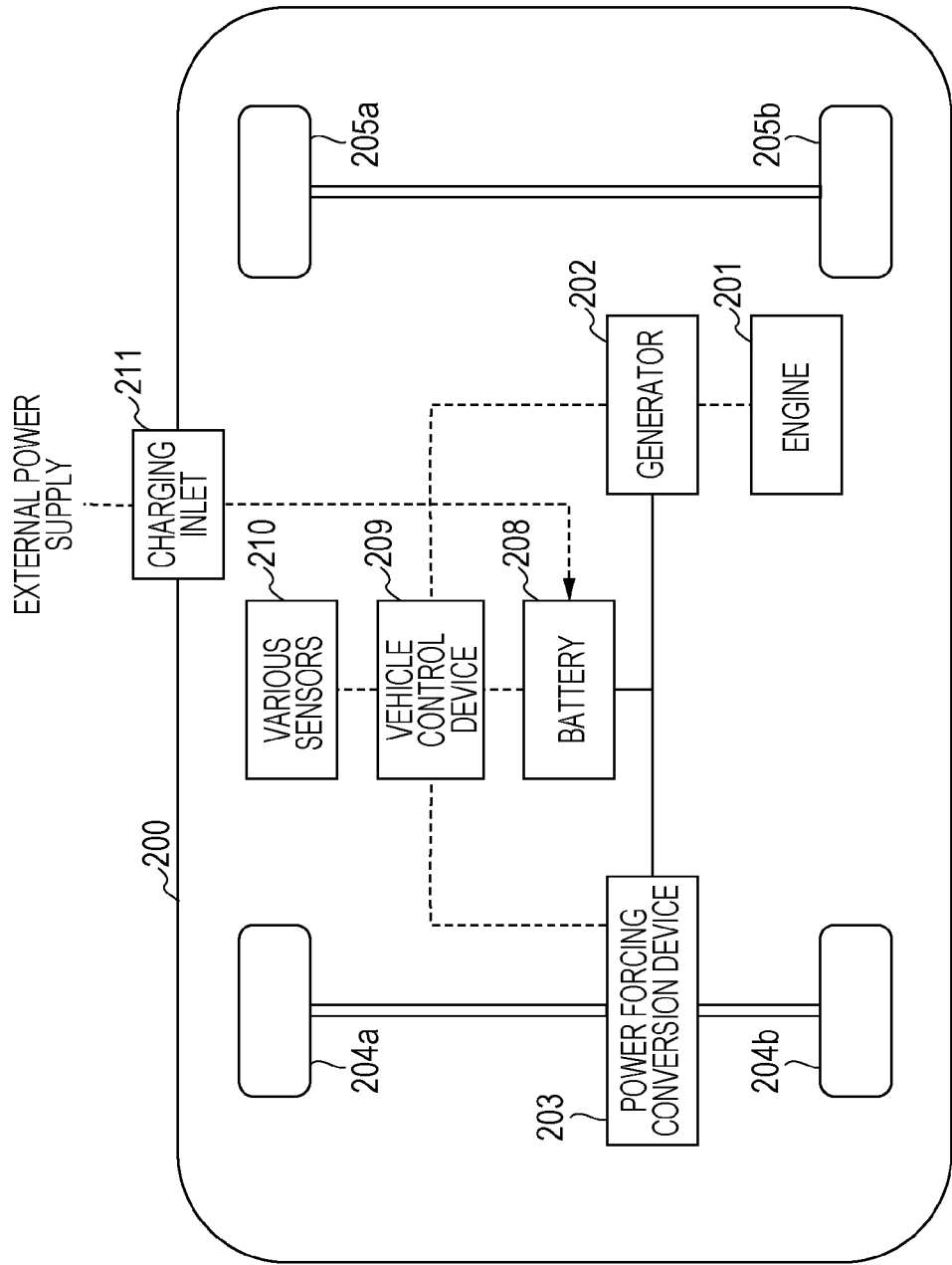
FIG. 10 is block diagram illustrating another application of a battery pack.

An example applying the present disclosure to an electrical storage system for a vehicle will be described with reference to FIG. 10. FIG. 22 is schematically illustrates one example of a configuration of a hybrid vehicle using a serial hybrid system according to the present disclosure. Serial hybrid system is a vehicle driven power driving force converter using the power generated by a generator moved by the engine or the power stored once a battery.

The hybrid vehicle 200 is loaded with the engine 201, the generator 202, power forcing conversion device 203, a driving wheel 204a, a driving wheel 204b, a wheel 205a, a wheel 205b, a battery 208, a vehicle control device 209 and various sensors 210 and a charging inlet 211. The electrical storage system according to the present disclosure described above is applied to a battery 208. One or more electrical storage system may be applied.

The hybrid vehicle 200 drives as a driving source the power driving force conversion device 203. An example of the power driving force conversion device 203 is a motor. The power forcing conversion device 203 is driven by the power of the battery 208 and a torque of the power forcing conversion device 203 is transmitted to the driving wheels 204a and 204b. In addition, the power forcing conversion device 203 is applicable to AC motor and DC motor using a direct current-alternating current (DC-AC) or an invert conversion (AC-DC conversion). Various sensors 210 control the number of rotation of the engine and an opening degree of a throttle valve (throttle opening degree; not shown) via the vehicle control device 209. Various sensors 210 include a speed sensor, an acceleration sensor and an engine rotation number sensor and the like.

The torque of the engine 201 is transmitted to the generator 202 and there is the possibility that the power produced by the torque of the generator 202 is stored in the battery 208.

If a hybrid vehicle is decelerated by a break mechanism, resistance at the time of the deceleration is adds as the torque to the power forcing conversion device 203. A regenerative electric power produced by the torque of the power forcing conversion device 203 is stored in the battery 208.

Since the battery 208 is connected to a power supply of the outside of the hybrid vehicle, the power supplies as an input port, the charge port 211 from the external power supply and the stored power can be stored.

Although not shown in the drawing, an information processing device may be provided for performing information processing on a vehicle control based on information on a secondary battery. As information processing device, for example, there is information processing device and the like performing a battery residual quantity induction based on information on a residual quantity.

In addition, as described above, though the example is illustrated for the serial hybrid vehicle driven by the motor using the power generated by the generator driven by the engine or using the power once storing them in the battery. However, the present disclosure is applicable to a parallel hybrid vehicle suitable switching the three methods performing only drive of the engine, only drive of the motor and the drive of the engine and motor. In addition, the present disclosure is effectively to an electric vehicle driven by only a driving motor without using the engine.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of controlling discharge in a battery pack, comprising:
    measuring an ambient temperature of a battery cell and a voltage of the battery cell;
    performing a first discharge processing of discharging the battery cell when the ambient temperature of the battery cell is higher than a first reference temperature and the voltage of the battery cell is higher than a first reference voltage and the first discharge processing continues when the ambient temperature of the battery cell is higher than a second reference temperature and the voltage of the battery cell is higher than a second reference voltage;
    performing a second discharge processing of discharging the battery cell when the ambient temperature of the battery cell is lower than the first reference temperature and the voltage of the battery cell is higher than a third reference voltage and the second discharge processing continues when the ambient temperature of the battery cell is lower than the first reference temperature and the voltage of the battery cell is higher than a fourth reference voltage.

2. The method of controlling discharge according to claim 1,
    wherein the second reference temperature is lower than the first reference temperature.

3. The method of controlling discharge according to claim 1,
    wherein the first discharge processing and the second discharge processing are performed by applying current to a discharge line,
    wherein the discharge line includes
    a positive line connected to a positive electrode of the battery cell,
    a negative line connected to a negative electrode of the battery cell,
    a first terminal connected to the positive line and disposed in a control section,
    a second terminal disposed in the control section and outputting a control signal having a different voltage level in response to a voltage of the battery cell, and
    a resistor connected between the second terminal and the negative line.

4. A battery pack comprising:
    a battery cell; and
    a control section to which information on an ambient temperature of the battery cell and information on a voltage of the battery cell are input,
    wherein the control section performs a first discharge processing of discharging the battery cell when the ambient temperature of the battery cell is higher than a first reference temperature and the voltage of the battery cell is higher than a first reference voltage and the first discharge processing continues when the ambient temperature of the battery cell is higher than a second reference temperature and the voltage of the battery cell is higher than a second reference voltage;
    the control section performs a second discharge processing of discharging the battery cell when the ambient temperature of the battery cell is lower than the first reference temperature and the voltage of the battery cell is higher than a third reference voltage and the second discharge processing continues when the ambient temperature of the battery cell is lower than the first reference temperature and the voltage of the battery cell is higher than a fourth reference voltage.

5. The battery pack according to claim 4,
    wherein the second reference temperature is lower than the first reference temperature.

6. A battery pack comprising:
    a battery cell;
    a positive line connected to a positive electrode of the battery cell;
    a negative line connected to a negative electrode of the battery cell; and
    a control section to which information on an ambient temperature of the battery cell and information on a voltage of the battery cell are input and which has at least a first terminal connected to the positive line and a second terminal outputting a control signal having a different voltage level in response to a voltage of the battery cell; and
    a resistor connected between the second terminal and the negative line,
    wherein the control section performs a first discharge processing of discharging the battery cell when the ambient temperature of the battery cell is higher than a first reference temperature and the voltage of the battery cell is higher than a first reference voltage and the first discharge processing continues when the ambient temperature of the battery cell is higher than a second reference temperature and the voltage of the battery cell is higher than a second reference voltage, and wherein the control section performs a second discharge processing of discharging the battery cell when the ambient temperature of the battery cell is lower than the first reference temperature, and the voltage of the battery cell is higher than a third reference voltage and the second discharge processing continues when the ambient temperature of the battery cell is lower than the first reference temperature and the voltage of the battery cell is higher than a fourth reference voltage, and
    the first discharge processing and the second discharge processing are configured to be performed by applying current to a discharge line including the positive line, the first terminal, the second terminal, the resistor and the negative line.

7. The battery pack according to claim 6,
    wherein the resistor is included in a switching element.

8. The battery pack according to claim 7,
    wherein the switching element is a digital transistor including a first resistor, a second resistor, and a transistor,
    wherein, the first resistor is connected between the second terminal and a base terminal of the transistor and, the second resistor is connected in parallel between a base terminal and an emitter terminal of the transistor.

9. An electrical storage system, wherein the battery pack according to claim 4 is charged by a power generator performing power generation based on a renewable energy source.

10. An electrical storage system comprising the battery pack according to claim 4, wherein the electrical storage system is configured to supply electric power to electronic apparatus connected to the battery pack.

11. An electronic apparatus receiving electric power from the battery pack according to claim 4.

12. An electric vehicle comprising:
   a conversion device that receives electric power from the battery pack according to claim 4 and converts the power into a driving force of the electric vehicle; and
   a control device that performs information processing related to vehicle control based on information related to the battery pack.

13. A power system comprising a power information transmission and reception unit that transmits and receives signals to and from external apparatuses via a network,
   wherein the power system is configured to perform charge and discharge control of the battery pack according to claim 4 based on information received by the power information transmission and reception unit.

14. A power system configured to receive electric power from the battery pack according to claim 4 or to supply electric power to the battery pack from a generator or a power network.

15. The battery pack according to claim 4,
   wherein the first reference voltage is higher than the second reference voltage and the third reference voltage is higher than the fourth reference voltage.

16. The battery pack according to claim 15,
   wherein the fourth reference voltage is higher than the first reference voltage.

17. The battery pack according to claim 6,
   wherein the first reference voltage is higher than the second reference voltage and the third reference voltage is higher than the fourth reference voltage.

18. The battery pack according to claim 17,
   wherein the fourth reference voltage is higher than the first reference voltage.

\* \* \* \* \*